United States Patent
Allon et al.

(10) Patent No.: US 11,425,162 B2
(45) Date of Patent: Aug. 23, 2022

(54) DETECTION OF MALICIOUS C2 CHANNELS ABUSING SOCIAL MEDIA SITES

(71) Applicant: PALO ALTO NETWORKS (ISRAEL ANALYTICS) LTD., Tel Aviv (IL)

(72) Inventors: Jonathan Allon, Haifa (IL); Aviad Meyer, Hod-Hasharon (IL); Tomer Schwartz, Tel Aviv-Jaffa (IL)

(73) Assignee: PALO ALTO NETWORKS (ISRAEL ANALYTICS) LTD., Tel Aviv (IL)

( * ) Notice: Subject to any disclaimer, the term of this patent is extended or adjusted under 35 U.S.C. 154(b) by 177 days.

(21) Appl. No.: 16/917,949

(22) Filed: Jul. 1, 2020

(65) Prior Publication Data

US 2022/0006819 A1   Jan. 6, 2022

(51) Int. Cl.
*H04L 29/06* (2006.01)
*H04L 9/40* (2022.01)

(52) U.S. Cl.
CPC .................... *H04L 63/145* (2013.01)

(58) Field of Classification Search
CPC ....................................................... H04L 63/145
See application file for complete search history.

(56) References Cited

U.S. PATENT DOCUMENTS

| | | | |
|---|---|---|---|
| 8,245,304 B1 | 8/2012 | Chen et al. |
| 8,555,388 B1 | 10/2013 | Wang et al. |
| 8,561,188 B1 | 10/2013 | Wang et al. |
| 8,677,487 B2 | 3/2014 | Balupari et al. |
| 8,826,434 B2 | 9/2014 | Merza |
| 8,966,625 B1 | 2/2015 | Zuk |
| 9,038,178 B1 | 5/2015 | Lin et al. |
| 9,130,982 B2 | 9/2015 | Gottlieb et al. |
| 9,147,071 B2 | 9/2015 | Sallam |
| 9,154,516 B1 | 10/2015 | Vaystikh et al. |
| 9,215,239 B1 | 12/2015 | Wang et al. |
| 9,342,691 B2 | 5/2016 | Maestas |
| 9,378,361 B1 | 6/2016 | Yen et al. |

(Continued)

OTHER PUBLICATIONS

U.S. Appl. No. 16/798,466 Office Action dated Nov. 24, 2021.

(Continued)

*Primary Examiner* — Jason K Gee
(74) *Attorney, Agent, or Firm* — Kligler & Associates Patent Attorneys Ltd

(57) ABSTRACT

Methods, apparatuses and computer program products implement embodiments of the present invention that include protecting a computing device by specifying one or more Internet sites that are accessible by one or more computing devices that communicate over a data network and identifying process binaries that executed on the computing devices accessed and retrieved data from any of the specified one more Internet sites. The identified process binaries are classified into a plurality of classes of matching process binaries, and for a given class, a count of the computing devices that that executed one of the process binaries of the given class is computed. When determining that the count of the computing devices is less than a predefined threshold, a preventive action is initiated to inhibit command and control (C2) channel transmissions from any of the computing devices that executed any of the process binaries of the given class.

25 Claims, 4 Drawing Sheets

(56) References Cited

U.S. PATENT DOCUMENTS

| | | | |
|---|---|---|---|
| 9,386,028 | B2 | 7/2016 | Altman |
| 9,462,008 | B2 | 10/2016 | Bartos et al. |
| 10,148,690 | B2 | 12/2018 | Shen et al. |
| 10,257,295 | B1 | 4/2019 | Alpert et al. |
| 10,425,436 | B2 | 9/2019 | Firstenberg et al. |
| 10,574,681 | B2 | 12/2020 | Meshi et al. |
| 2003/0110379 | A1 | 6/2003 | Ylonen et al. |
| 2007/0143852 | A1 | 6/2007 | Keanini et al. |
| 2008/0082662 | A1 | 4/2008 | Dandliker et al. |
| 2008/0256622 | A1 | 10/2008 | Neystadt et al. |
| 2009/0119397 | A1 | 5/2009 | Neerdaels |
| 2011/0016525 | A1 | 1/2011 | Jeong et al. |
| 2011/0239300 | A1* | 9/2011 | Klein .................. G06F 21/565 726/23 |
| 2011/0283357 | A1 | 11/2011 | Pandrangi et al. |
| 2011/0302656 | A1 | 12/2011 | El-Moussa |
| 2012/0158626 | A1 | 6/2012 | Zhu et al. |
| 2013/0007233 | A1 | 1/2013 | Lv et al. |
| 2013/0031625 | A1* | 1/2013 | Lim .................... H04L 63/1416 726/22 |
| 2014/0007238 | A1 | 1/2014 | Magee et al. |
| 2014/0165207 | A1 | 6/2014 | Engel et al. |
| 2015/0128263 | A1* | 5/2015 | Raugas ............... H04L 63/1433 726/23 |
| 2015/0170072 | A1 | 6/2015 | Grant et al. |
| 2015/0172300 | A1 | 6/2015 | Cochenour |
| 2015/0358344 | A1 | 12/2015 | Mumcuoglu et al. |
| 2015/0373039 | A1 | 12/2015 | Wang |
| 2015/0373043 | A1 | 12/2015 | Wang et al. |
| 2016/0042287 | A1 | 2/2016 | Eldardiry et al. |
| 2016/0057165 | A1 | 2/2016 | Thakar et al. |
| 2016/0134651 | A1 | 5/2016 | Hu et al. |
| 2016/0150004 | A1 | 5/2016 | Hentunen |
| 2016/0156655 | A1 | 6/2016 | Lotem et al. |
| 2016/0234167 | A1 | 8/2016 | Engel et al. |
| 2016/0352772 | A1 | 12/2016 | O'Connor |
| 2016/0366159 | A1 | 12/2016 | Chiba et al. |
| 2017/0026398 | A1 | 1/2017 | Mumcuoglu et al. |
| 2017/0041333 | A1 | 2/2017 | Mahjoub et al. |
| 2017/0126718 | A1 | 5/2017 | Baradaran et al. |
| 2018/0013778 | A1 | 1/2018 | Lim et al. |
| 2018/0288073 | A1 | 10/2018 | Hopper |
| 2018/0351930 | A1 | 12/2018 | Kim et al. |
| 2019/0007440 | A1 | 1/2019 | Lavi et al. |
| 2019/0081952 | A1 | 3/2019 | Wood |
| 2019/0250911 | A1* | 8/2019 | Lospinuso ................ G06F 8/75 |
| 2019/0319981 | A1 | 10/2019 | Meshi et al. |
| 2019/0387005 | A1 | 12/2019 | Zawoad et al. |
| 2020/0007548 | A1 | 1/2020 | Sanghavi et al. |
| 2020/0014714 | A1 | 1/2020 | Mortensen et al. |
| 2020/0177625 | A1 | 6/2020 | Rouvinen |
| 2020/0213333 | A1 | 7/2020 | Deutschmann et al. |
| 2020/0244658 | A1 | 7/2020 | Meshi et al. |
| 2021/0014198 | A1 | 1/2021 | Amoudi et al. |
| 2021/0136037 | A1 | 5/2021 | Balasubramaniam |

OTHER PUBLICATIONS

Wei et al., "Identifying New Spam Domains by Hosting IPS: Improving Domain Blacklisting", Dept. of Computer and Information Sciences, University of Alabama at Birmingham, pp. 1-8, Jan. 2010.

Iana., "Autonomous System (AS) Numbers", 1 page, Jul. 29, 2016.

Gross et al., "FIRE: Finding Rogue nEtworks", Annual Conference on Computer Security Applications, pp. 1-10, Dec. 7-11, 2009.

Frosch., "Mining DNS-related Data for Suspicious Features", Ruhr Universitat Bochum, Master's Thesis, pp. 1-88, Dec. 23, 2011.

Bilge et at., "Disclosure: Detecting Botnet Command and Control Servers Through Large-Scale NetFlow Analysis", Annual Conference on Computer Security Applications, pp. 1-10, Dec. 3-7, 2012.

Blum., "Combining Labeled and Unlabeled Data with Co-Training", Carnegie Mellon University, Research Showcase @ CMU, Computer Science Department, pp. 1-11, Jul. 1998.

Felegyhazi et al., "On the Potential of Proactive Domain Blacklisting", LEET'10 Proceedings of the 3rd USENIX Conference on Large-scale exploits and emergent threats, pp. 1-8, San Jose, USA, Apr. 27, 2010.

Konte et al., "ASwatch: An AS Reputation System to Expose Bulletproof Hosting ASes", SIGCOMM , pp. 625-638, Aug. 17-21, 2015.

Markowitz, N., "Bullet Proof Hosting: A Theoretical Model", Security Week, pp. Jun. 1-5, 29, 2010, downloaded from http://www.infosecisland.com/blogview/4487-Bullet-Proof-Hosting-A-Theoretical-Model.html.

Markowitz, N., "Patterns of Use and Abuse with IP Addresses", Security Week, pp. 1-4, Jul. 10, 2010, downloaded from http://infosecisland.com/blogview/5068-Patterns-of-Use-and-Abuse-with-IP-Addresses.html.

Goncharov,M., "Criminal Hideouts for Lease: Bulletproof Hosting Services", Forward-Looking Threat Research (FTR) Team, A TrendLabsSM Research Paper, pp. 1-28, Jul. 3, 2015.

Bilge at al., "Exposure: Finding Malicious Domains Using Passive DNS Analysis ", NDSS Symposium, pp. 1-17 Feb. 6-9, 2011.

Xu et al., "We know it before you do: Predicting Malicious Domains", Virus Bulletin Conference, pp. 73-33, Sep. 2014.

Meshi et al., U.S. Appl. No. 16/798,466, filed Feb. 24, 2020.

Meyer et al., U.S. Appl. No. 16/789,442, filed Feb. 13, 2020.

Palo Alto Networks, "Cortex XDR", p. 1-7, year 2020.

U.S. Appl. No. 16/798,466 Office Action dated May 11, 2022.

* cited by examiner

DETECTION OF MALICIOUS C2 CHANNELS ABUSING SOCIAL MEDIA SITES

FIELD OF THE INVENTION

The present invention relates generally to computer security and networks, and particularly to detecting command and control (C2) attacks that abuse social media websites.

BACKGROUND OF THE INVENTION

In many computers and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to detect and prevent malware from spreading through the network.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for protecting a computing device, including specifying one or more Internet sites that are accessible by one or more computing devices that communicate over a data network, identifying process binaries that executed on the computing devices accessed and retrieved data from any of the specified one more Internet sites, classifying, by a processor, the identified process binaries into a plurality of classes of matching process binaries, computing, for a given class, a count of the computing devices that that executed one of the process binaries of the given class, and when determining that the count of the computing devices is less than a predefined threshold, initiating a preventive action to inhibit command and control (C2) channel transmissions from any of the computing devices that executed any of the process binaries of the given class.

In one embodiment, the Internet sites include social media sites.

In another embodiment, identifying the process binaries includes identifying process binaries that executed on the computing devices accessed and retrieved data from any of the specified one more Internet sites during a specified time period.

In an additional embodiment, identifying the process binaries includes receiving, from software agents executing on the computing devices, information on the process binaries executing on the computing devices.

In a further embodiment, the method may include determining respective roles for the computing devices, specifying a given role, identifying one or more of computing devices having the specified role, and excluding the identified one or more computing devices from the count.

In a supplemental embodiment, computing the count includes identifying the Internet sites accessed by the process binaries of the given class, and computing, for each given identified Internet site, a respective additional count of the computing devices executing any of the process binaries of the given class and accessing the given Internet site, wherein determining that the count is less than a predefined threshold includes determining that a given additional count is less than a specified additional threshold, and wherein initiating the preventive action includes initiating the preventive action for any of the computing devices executing the process binaries corresponding to the given additional count.

In another embodiment, computing the count includes identifying respective command lines invoking the process binaries of the given class, and computing, for each given identified command line, a respective additional count of the computing devices executing the identified command lines matching the given identified command line and invoking the process binaries of the given class, wherein determining that the count is less than a predefined threshold includes determining that a given additional count is less than a specified additional threshold, and wherein initiating the preventive action includes initiating the preventive action for any of the computing devices executing the process binaries corresponding to the given additional count.

In an additional embodiment, computing the count includes computing respective periodicities that the computing devices executing the identified process binaries of the class accessed each of the specified Internet sites, wherein determining that the count is less than a predefined threshold includes determining that a given periodicity meets a specified periodicity threshold, and wherein initiating the preventive action includes initiating the preventive action for the computing device having the given periodicity.

In a further embodiment, computing the respective count includes identifying respective execution chains invoking the process binaries of the given class, and computing, for each given identified execution chain, a respective additional count of the computing devices executing the identified execution chains matching the given identified execution chain and invoking the process binaries of the given class, wherein determining that the count is less than a predefined threshold includes determining that a given additional count is less than a specified additional threshold, and wherein initiating the preventive action includes initiating the preventive action for any of the computing devices executing the process binaries corresponding to the given additional count.

In a supplemental embodiment, computing the count includes identifying respective execution chains invoking the process binaries of the given class, identifying the Internet sites accessed by the process binaries of the given class, and computing, for each combination of given identified execution chain and a given identified Internet site, a respective additional count of the computing devices executing the identified execution chains matching the given identified execution chain and invoking the process binaries of the given class, wherein determining that the respective count is less than a predefined threshold includes determining that a given additional count is less than a specified additional threshold, and wherein initiating the preventive action includes initiating the preventive action for any of the computing devices executing the process binaries corresponding to the given additional count.

In another embodiment, computing the count includes identifying the Internet sites accessed by the process binaries of the given class, identifying respective execution chains invoking the process binaries of the given class, computing, for each given distinct execution chain and for each given distinct Internet site, a respective periodicity that the computing devices executing respective execution chains matching the given distinct execution chain accessed the given distinct Internet site, wherein determining that the count is less than a predefined threshold includes determining that a given periodicity meets a specified periodicity threshold, and wherein initiating the preventive action comp includes rises initiating the preventive action for the computing device executing the execution chain including the given periodicity meeting the specified periodicity threshold.

In an additional embodiment, computing the count includes computing a count of distinct users that that were operating the computing devices that executed any process binary of the given class.

There is also provided, in accordance with an embodiment of the present invention, an apparatus for protecting a computing system, including a network interface card (NIC), and at least one processor configured to specify one or more Internet sites that are accessible by one or more computing devices that communicate over a data network, to identify process binaries that executed on the computing devices accessed and retrieved data from any of the one more specified Internet sites during a specified time period, to classify the identified process binaries into a plurality of classes of matching process binaries, to compute, for a given class, a count of the computing devices that that executed one of the process binaries of the given class, and when determining that the count of the computing devices is less than a predefined threshold, to initiate a preventive action to inhibit command and control (C2) channel transmissions from any of the computing devices that executed any of the process binaries of the given class.

There is additionally provided, in accordance with an embodiment of the present invention, a computer software product for protecting a computing system, the product including a non-transitory computer-readable medium, in which program instructions are stored, which instructions, when read by a computer, cause the computer to specify one or more Internet sites that are accessible by one or more computing devices that communicate over a data network, to identify process binaries that executed on the computing devices accessed and retrieved data from any of the one more specified Internet sites a specified time period, to classify the identified process binaries into a plurality of classes of matching process binaries, to compute, for a given class, a count of the computing devices that that executed one of the process binaries of the given class, and when determining that the count of the computing devices is less than a predefined threshold, to initiate a preventive action to inhibit command and control (C2) channel transmissions from any of the computing devices that executed any of the process binaries of the given class.

BRIEF DESCRIPTION OF THE DRAWINGS

The disclosure is herein described, by way of example only, with reference to the accompanying drawings, wherein.

DETAILED DESCRIPTION OF EMBODIMENTS

Network security systems on private networks (e.g., corporate networks) typically limit or prevent remote computers from initiating connections to local computers on the private network. To overcome this limitation, an attacker may infect a given local computer with malware that opens a Command and Control (C2) channel that can periodically contact the attacker from within the network. Upon being contacted, the attacker can respond (i.e., to the malware) with instructions or requests to exfiltrate sensitive data from the private network.

In one type of cyber-attack that uses a C2 channel, the malware opens a C2 channel with the attacker's server, and requests, via the C2 channel, malicious instructions from the attacker's server, and performs malicious operations in response to the received instructions. One example of a malicious operation comprises exfiltrating sensitive data from the infected computer to the attacker's server.

In another type of cyberattack that uses a C2 channel, the malware can abuse a social media site by opening a C2 channel with the social media site in order to retrieve instructions for a malicious operation. For example, the malware can retrieve a Tweet™ from a Twitter™ feed (administered by Twitter Inc., San Francisco, Calif. 94103 USA), and extract malicious instructions from the retrieved Tweet™.

Embodiments of the present invention provide methods and systems for detecting, on one or more computing devices that communicate over a data network, C2 channels that abuse social media sites in order to retrieve malicious instructions. As described hereinbelow, one or more Internet sites are specified, and process binaries that executed on the computing devices accessed and retrieved data from any of the one more specified Internet sites are identified. The identified process binaries are classified into a plurality of classes of matching process binaries, and for a given class, a count of the computing devices that that executed one of the process binaries of the given class is computed. Upon determining that the computed number of the computing devices is less than a predefined threshold, a preventive action is initiated to inhibit command and control (C2) channel transmissions from any of the computing devices that executed any of the process binaries of the given class.

In addition to identifying and analyzing the processes accessing the specified Internet sites, systems implementing embodiments of the present invention can also analyze additional features of the processes in order to detect C2 channels that abuse social media sites. As described hereinbelow, examples of these features include command-line information, execution chains, users, roles of the computing devices, combinations of processes and accessed Internet sites, and periodicity of the accesses.

System Description

Figure 1:
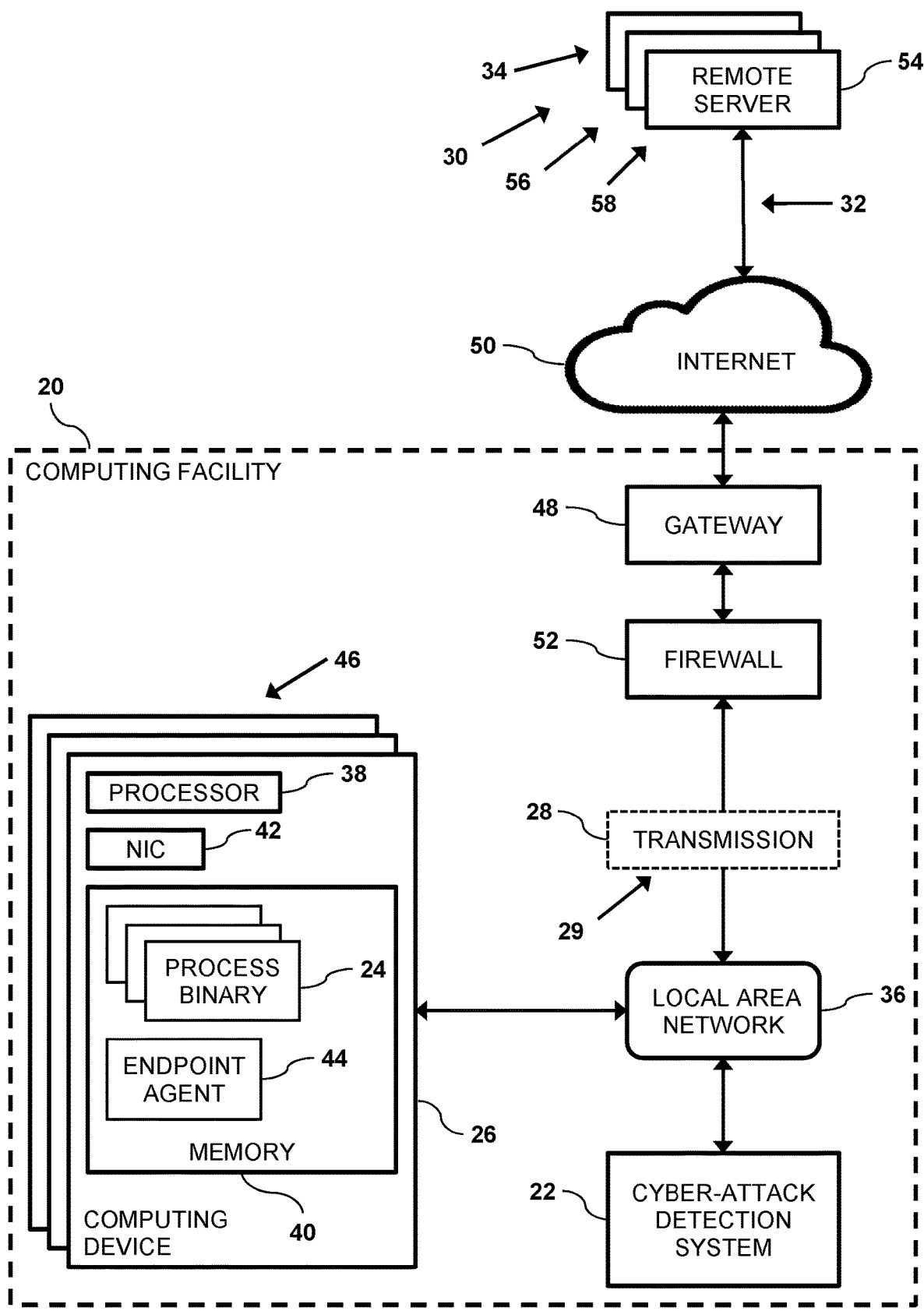
FIG. 1 is a block diagram that schematically shows a computing facility comprising a cyber-attack detection system that can detect command and control (C2) channels abusing social media sites, in accordance with an embodiment of the present invention.

FIG. 1 is a block diagram that schematically shows an example of a computing facility 20 comprising a cyber-attack detection system 22 that is configured to analyze process binaries 24 in order to detect any of the transmissions that use a command and a control (C2) channel 32 that abuses a given Internet site 30 that comprises a social media site 34, in accordance with an embodiment of the present invention. In embodiments described herein, each process binary 24 comprises a set of machine code instructions that executes on computing devices 26 (also known as hosts). In some embodiments, process binaries are configured to generate transmissions 28 that computing devices 26 can convey to Internet sites 30. As described hereinbelow, computing devices 26 can convey some of transmissions 28 to social media sites 34 that comprise a subset of Internet sites 30, and that are configured to receive, store and convey social media content.

Internet sites 30 (i.e., servers hosting the internet sites, as described hereinbelow) can also convey transmissions 28 to computing devices 26. Each transmission 28 comprises data 29 conveyed either from a given computing device 26 to a given Internet site 30 or from a given Internet site 30 to a given computing device 26.

Each computing device 26 may comprise any type of device (i.e., physical or virtual) that is configured to communicate over a data network such as a local area network (LAN) 36, and has an IP address assigned for this purpose. Each given computing device 26 may comprise, for example, a device processor 38, a device memory 40 and a device network interface card 42 that couples the given computing device to LAN 36.

In operation, each processor 38 executes, from its respective memory 40, process binaries 24 and an endpoint agent 44. Each given process binary 24 may comprise an instance of a computer program that is being executed by one or many threads on a given processor 38. In embodiments described herein, each given endpoint agent 44 executing on a given processor 38 comprises a software application configured to analyze information on execution and activity of a set of process binaries 24 executing on the given processor, and to convey the analyzed information to cyber-attack detection system 22. An example of endpoint agent 44 is XDR™ produced by Palo Alto Networks, Inc. of 3000 Tannery Way, Santa Clara, Calif. 95054 USA.

In embodiments of the present invention each given computing device 26 may also comprise a device identifier (ID) 46. Examples of device IDs 46 include, but are not limited to, a media access control (MAC) addresses and Internet Protocol (IP) addresses that can be used to distinctly identify each computing device 26. While any given time, each given computing device 26 is assigned a distinct IP address, the given computing device may be associated with multiple IP addresses over an extended time period. For example, the IP address for a given computing device 26 may change after a reboot of the given computing device.

Computing facility 20 may also comprise an Internet gateway 48, which couples computing facility 20 to a public network 50 such as the Internet. To protect computing devices 26, computing facility 20 may also comprise a firewall 52 that controls data traffic between LAN 36 and Internet 50 based on predetermined security rules.

In the configuration shown in FIG. 1, each given Internet site 30 (including each social media site 34) is hosted by one or more remote servers 54, and comprises an Internet Protocol (IP) address 56 and a domain name 58.

Figure 2A:
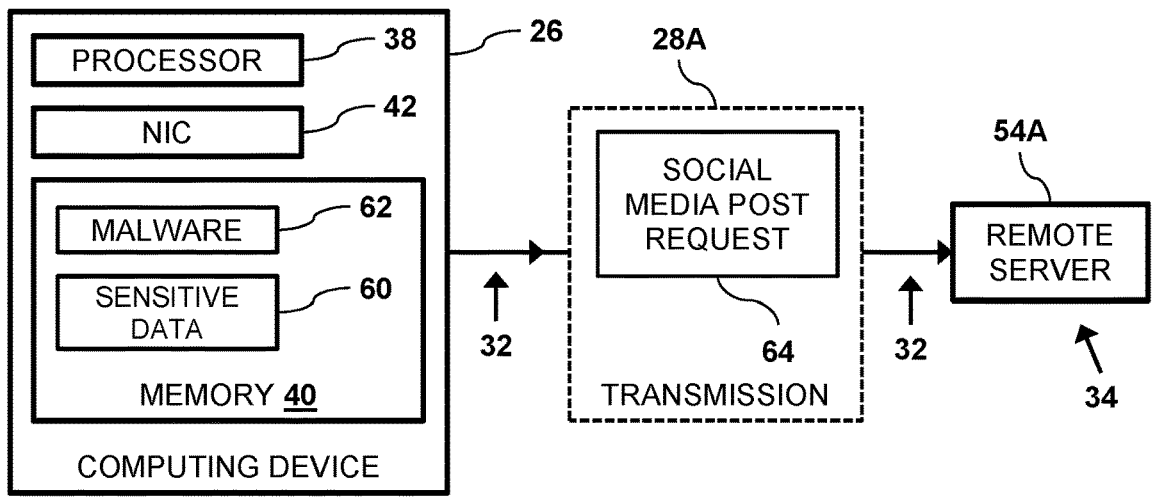
FIGS. 2A-2C are block diagrams showing an example of a cyber-attack that abuses a given social media site, in accordance with an embodiment of the present invention.
Figure 2B:
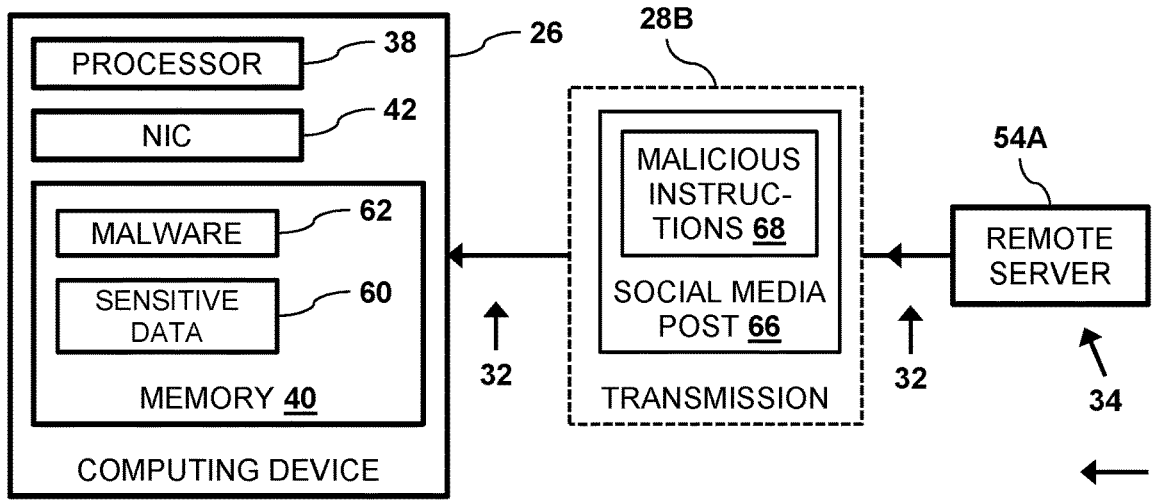
Figure 2C:
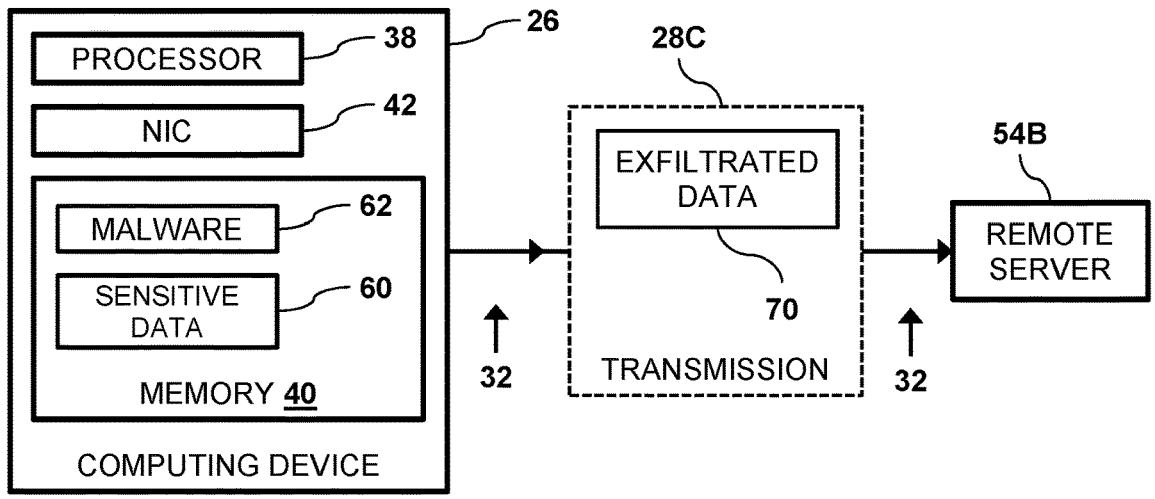

FIGS. 2A, 2B and 2D, referred to collectively as FIG. 2, are block diagram showing an example of a cyber-attack that uses a given C2 channel 32 to exfiltrate sensitive data 60, in accordance with an embodiment of the present invention. In FIG. 2, transmissions 28 and remote servers 54 may be differentiated by appending a letter to the identifying numeral, so that the transmissions comprise transmissions 28A-28C, and the remote servers comprise remote servers 54A and 54B.

In a first step of the cyber-attack, a given processor 38 of a given computing device 26 starts executing an attacker's malware application 62 from its respective memory 40.

In a second step of the cyber-attack, as shown in FIG. 2A, malware application transmits, via C2 channel 32, transmission 28A to a given social media site 34 hosted by a given remote server 54A. Transmission 28A comprises a social media post request 64.

In a third step of the cyber-attack, as shown in FIG. 2B, in response to receiving request 64, remote server 54A transmits transmission 28B to the given computing device. Transmission 28B comprises a social media post 66 (i.e., the social media post requested in request 64).

Finally, in a fourth step of the cyber-attack, malware application 62 extracts, from social media post 66, malicious instructions 68, and performs the malicious instructions. In the example shown in FIG. 2C, the given processor performs the malicious instructions by generating and transmitting, to remote server 54B (i.e., the attacker's server), transmission 28C comprising exfiltrated data 70 (i.e., a subset of sensitive data 60).

While FIG. 2 shows an example of malware application 62 that exfiltrates sensitive data 60 from an infected computing device 26, other types of malware application 62 are considered to be within the spirit and scope of the present invention. For example, malware application 62 can be configured to perform malicious activity such as destroying sensitive data 60 or locking the infected computing device until a ransom is paid.

Examples of social media sites 34 that malware application 62 can abuse using C2 channel 32 include, but are not limited to:

Twitter™. In this example, malware application 62 can receive transmission 28B comprising malicious instructions 68 embedded in a Tweet™.

Instagram™ deployed by Facebook™ Inc., 1601 Willow Road, Menlo Park, Calif. 94025. In this example, malware application 62 can receive transmission 28B comprising malicious instructions 68 embedded in an image or a (text) post.

Facebook™ deployed by Facebook™ Inc. In this example, malware application 62 can receive transmission 28B comprising malicious instructions 68 embedded in a text post.

Figure 3:
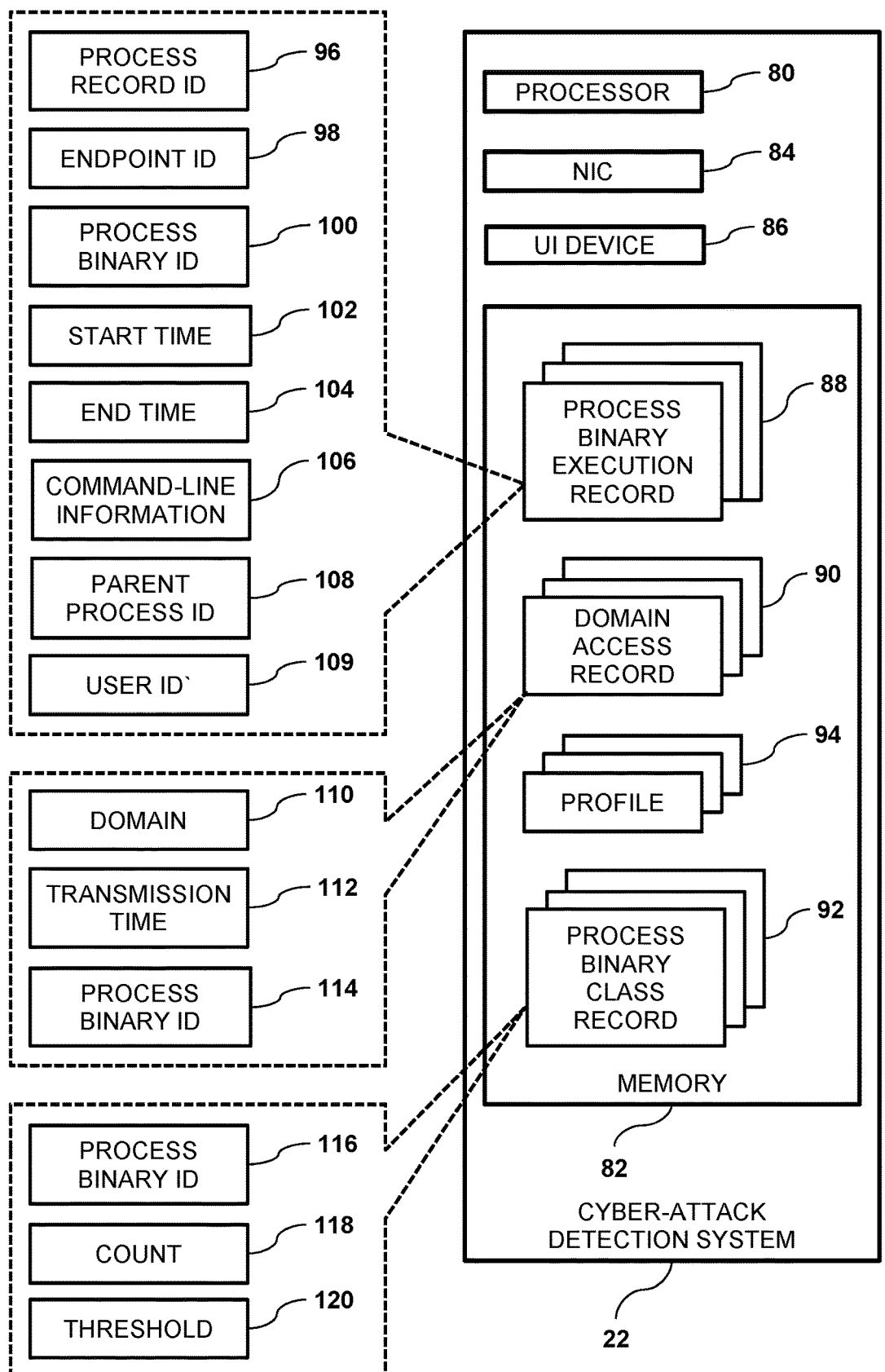
FIG. 3 is a block diagram of a cyber-attack detection system, in accordance with an embodiment of the present invention.

FIG. 3 is a block diagram showing hardware and software components of cyber-attack detection system 22, in accordance with an embodiment of the present invention. In some embodiments, cyber-attack detection system 22 comprises a system processor 80 and a system memory 82, which are coupled by a system bus (not shown) to a network interface controller (NIC) 84 that couples the cyber-attack detection system to network 36. In some embodiments, cyber-attack detection system 22 may comprise a user interface (UI) device 86 (e.g., an LED display) or another type of output interface.

In the configuration shown in FIG. 3, memory 82 stores respective pluralities of process binary execution records 88, domain access records 90, process binary class records 92 and profiles 94. In some embodiments, upon processor 80 receiving, from endpoint agents 44, information on process binaries 24 and domain names 58 accessed by the process binaries, the system processor populates process binary execution records 88, domain access records 90 and process binary class records 92 with the received information. Profiles 94 are described in the description referencing FIG. 4 hereinbelow.

Each given process binary execution record 88 corresponds to a given process binary 24 executing on a given processor 38 of a given computing device 26, and comprises the following information:

A distinct process record ID 96 that distinctly identifies the given process record.

An endpoint ID 98 that references the device ID of the given computing device.

A process binary ID 100 referencing the given process binary. In some embodiments, the process binary ID for the given process binary may comprise one or more attributes of the given process binary. Examples of attributes include a name of the given process binary, a bit pattern of a given process binary, a size of the given process binary and a cryptographic hash of the given process binary. In embodiments described herein, a first given process binary 24 is considered to match a second process binary 24 if they have matching respective process binary IDs 100 (i.e., matching attributes).

A start time 102 indicating a date and time that the given process binary started executing on the given computing device.

An end time 104 indicating a date and time that execution of the given process binary ended on the given computing device. If the given process binary is still executing on the given computing device, then the end time can be represented as a blank/nil value.

Command-line information 106 (also referred to herein simply as a command-line). Command-line information 106 can refer to the entire command-line used to launch the given process binary. In some embodiments, command-line 106 may refer to parameters such as command-line switches (also known as command-line options) with which the given process binary was launched. For example the Chrome™ browser (can be launched with the command-line switch "--restore-last-session", which restores all the tabs were open when the Chrome™ process binary last (i.e., most recently) closed.

A parent process ID 108 indicating the process ID record corresponding to a parent process binary 24 that executed on the given computing device and called the given process. In embodiments of the present invention, processor 80 can use the parent process IDs in process binary execution records 88 to identify an execution chain for the given process. In embodiments described herein an execution chain for a given process comprises a chain (i.e., a sequence) of process binaries 24 whose endpoint comprises the given process binary, wherein the given process binary is the last process binary 24 in the chain.

User ID 109 indicating a person operating the given computing device when the given process binary started executing on the given computing device.

Each domain access record 90 corresponds to each instance when a given process binary 24 executing on a given computing device 26 conveyed a given transmission 28 to a given remote server 54 (i.e., a given Internet site 30) referenced by a given domain name 58, and comprises the following information:

A domain name 110 comprising the given domain name 58.

A transmission time 112 indicating a date and time of the given transmission.

A process ID reference 114 comprising a given process record ID 96 referencing a given process binary execution record 88 indicating the given process binary executing on the given computing device.

In embodiments of the present invention, processor 80 tracks, for each given process binary ID 100, a count of process binaries 24 whose respective process binary IDs "match" the given process ID and that executed on different computing devices 26. In order to track this information, each process binary class record 92 comprises the following information:

A process binary ID 116. Each different process binary ID 100 in process binary execution records 88 has a corresponding process binary class record 92 comprising a given process binary ID 116 (i.e., that corresponds to a given process binary ID 100).

A count 118 that comprises a count of different computing devices 26 that executed any process binaries 24 matching the given process binary ID.

A threshold 120 comprising a count of computing devices 26 executing process binaries 24 that match the given process binary ID.

In some embodiments, the tasks of analyzing process binaries 24 as described herein may be split among multiple devices within computing facility 20 (e.g., additional cyber-attack detection systems 22 and/or computing devices 26) or external to the computing facility (e.g., a data cloud based application). In additional embodiments, the functionality of some or all of computing devices 26 and/or cyber-attack detection system 22 may be deployed in computing facility 20 as virtual machines.

Processors 38 and 80 comprise general-purpose central processing units (CPU) or special-purpose embedded processors, which are programmed in software or firmware to carry out the functions described herein. This software may be downloaded to computing devices 26 and cyber-attack detection system 22 in electronic form, over a network, for example. Additionally or alternatively, the software may be stored on tangible, non-transitory computer-readable media, such as optical, magnetic, or electronic memory media. Further additionally or alternatively, at least some of the functions of processors 38 and 80 may be carried out by hard-wired or programmable digital logic circuits.

Examples of memories 64 and 82 include dynamic random-access memories and non-volatile random-access memories. In some embodiments, the memories may comprise non-volatile storage devices such as hard disk drives and solid-state disk drives.

Malicious C2 Channel Detection

Figure 4:
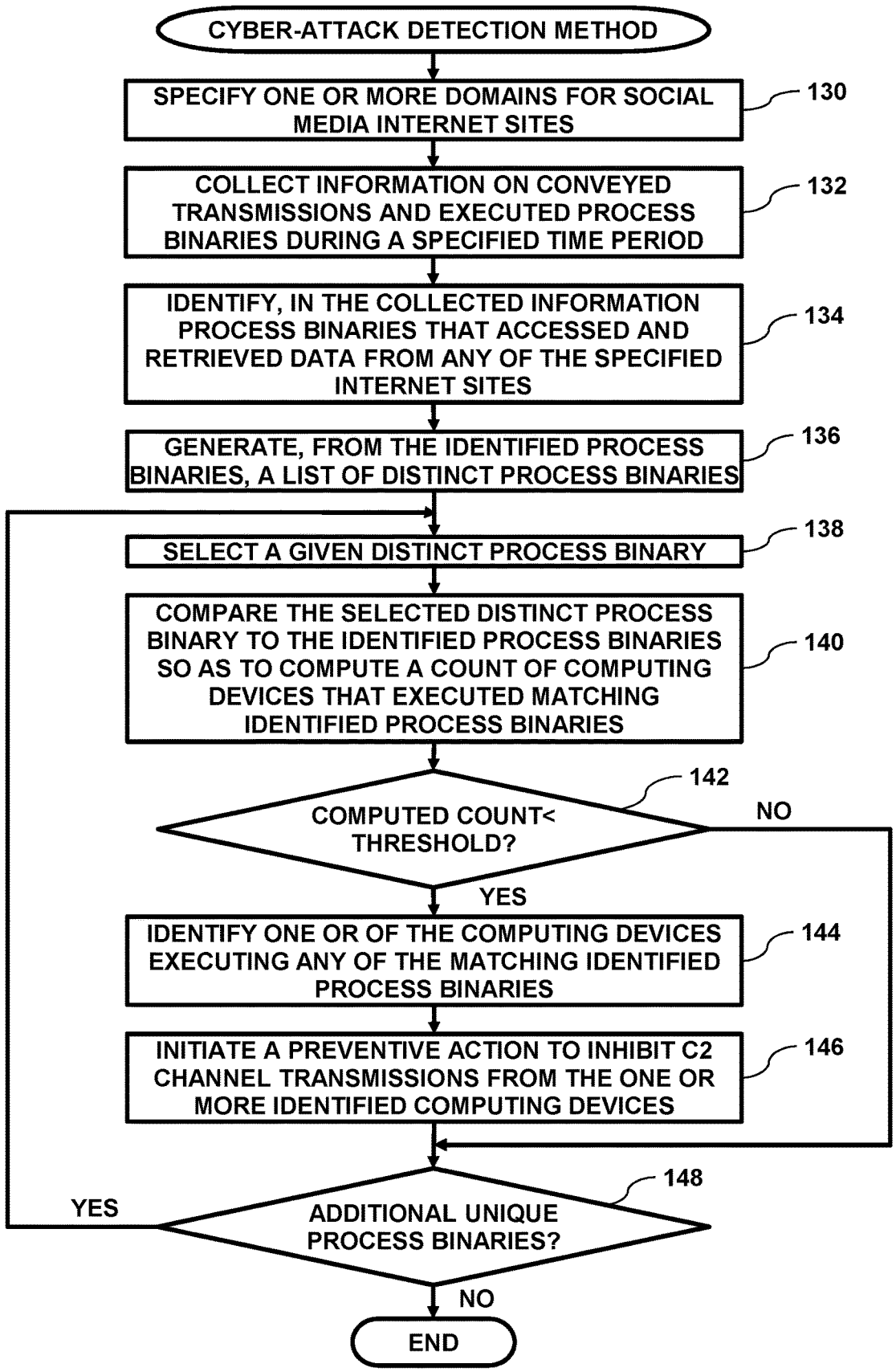
FIG. 4 is a flow diagram that schematically illustrates a method of detecting a cyber-attack that uses a C2 channel to abuse social media sites, in accordance with an embodiment of the present invention.

FIG. 4 is a flow diagram that schematically illustrates a method of detecting a cyber-attack that uses a C2 channel to abuse social media sites, in accordance with an embodiment of the present invention.

In step 130, processor 80 specifies one or more domain names 58 of Internet sites 30. In some embodiments, the specified domains are for social media sites such as www.twitter.com, www.instagram.com and www.facebook.com.

In step 132, processor 80 collects information, during a specified time period (e.g., the most recent 14 days), on transmissions 28 that were conveyed on network 36 and process binaries 24 that executed on computing devices. In some embodiments processor 80 can retrieve the one or more specified domains and specified time period from memory 82, or receive an input (e.g., from a user or a network message) comprising the one or more specified domains and the specified time period.

In embodiments described herein, processor 80 can store the collected information as follows:

Upon receiving, from a given endpoint agent 44, information for a given process binary 24 executing on a given computing device 26, processor 80 can add a new process binary execution record 88, and for the added binary execution record, the system processor can:

Store, to process record ID 96, a distinct value.

Store, to endpoint ID 98, the device ID for the given computing device.

Determine a value for the given process binary, and store the value to process binary ID 100.

Store, to start time 102, the date and time that the given computing device started executing the given process binary.

Store, to end time 104, the date and time that the given process binary stopped executing on the given computing device. In some embodiments, processor 80 can store a null value to end time 104 if the given computing device is still executing the given process binary at the conclusion of the specified time period.

Store, to command-line information 106, a command-line or any command-line parameters (e.g., switches) that were used to initialize execution of the given process binary.

Store, to parent process ID 108, the process binary ID of the parent process binary for the given binary ID. Processor 80 can store a null value to parent process ID 108 if there was no parent process binary.

Upon receiving, from firewall 52 a notification of a given transmission 28 from a given computing device 26 to any of the Internet sites specified in step 130, processor 80 can add a new domain access record 90, and for the added domain access record, the system processor can:

Store the domain name 58 corresponding to the given Internet site to domain 110.

Store the date and time of the given transmission to transmission time 112.

Identify, from information received from the endpoint agent executing on the given computing device, a given process binary 24 that generated the given transmission.

Identify a given process binary execution record corresponding to the given process binary, and storing the process record ID 96 for the identified process binary execution record to process ID reference 114.

In step 134, processor 80 analyzes domain access records 90 and process binary execution records 88 so as to identify any process binaries 24 that accessed and retrieved data 29 (i.e., in transmissions 28) from any of the specified Internet sites during the specified time period. For example, the given process may comprise a software application such as PowerShell.exe and cmd.exe that are produced by Microsoft Corporation, One Microsoft Way, Redmond, Wash. 98052 USA. In some embodiments, processor 80 can filter out web browser processes (e.g., Chrome™ produced by Alphabet Inc., 1600 Amphitheatre Parkway, Mountain View, Calif. 94043 USA), since web browsers are "expected" to communicate with social media sites 34.

In step 136, processor 80 analyzes the identified process binaries so as to generate a list of distinct process binaries 24. As described supra, each processor binary ID 100 corresponds to a given process binary 24 and comprises attributes of the given process binary such as a size or a cryptographic hash. In some embodiments, processor 80 can perform the following steps to generate the list of distinct process binaries 24:

Identify, from process binary execution records 88, a list of distinct process binary IDs 100.

For each given distinct process binary ID 100, add a new process binary class record 92, and storing the given distinct process binary ID to process binary ID 116 in the added process binary class record.

In some embodiments, processor can store respective threshold values to thresholds 118 in the added records. In process binary class records 92, thresholds 120 may comprise the same or different respective values.

In step 138, processor 80 selects a given distinct process binary 24. In embodiments described herein, processor 80 can select the given process binary by selecting a given (i.e., and previously unselected) process binary class record 92.

In step 140, processor 80 compares the selected distinct process binary to the process binaries identified in step 134 so as to compute the count of distinct computing devices 26 that executed any process binary 24 matching the distinct process binary selected in step 138. To perform step 140, processor 80 can identify domain access records having process ID references 114 referencing respective process binary execution records 88 whose respective process binary IDs 100 match process binary ID 116 in the given process binary class record 92, identify a number of distinct endpoint IDs in the respective process binary execution records, and store the identified number to count 118 in the given process binary class record 92.

In some embodiments, the computed count of computing devices 26 (i.e., in step 140) can indicate a number of distinct user IDs 109 that were operating the computing devices that executed any process binary 24 that match the distinct process binary selected in step 136.

In step 142, processor 80 compares, in the given process binary class record 92, count 118 to threshold 120. If count 118 is less than threshold 120, then in step 144, then processor 80 analyzes process execution records 88 so as to identify one or more of computing devices 26 that execute any process binaries 24 matching selected distinct process binary. In embodiments of the present invention, each the computing devices identified in step 144 are suspected of using C2 channels 32 so as to abuse social media sites 34.

In a first embodiment, a given threshold 120 may comprise a specified number of computing devices 26. In a second embodiment, a given threshold 120 may indicate a specified percentage of computing devices 26. For example, if threshold 120 is 1% and computing facility 20 comprises 200 computing devices 26, then in step 142 using the second embodiment, processor 80 can determine that count 120 is less that threshold 118 if the count of distinct computing devices 26 executing the process binaries identified in step 134 that match the given distinct process binary is less than 2 (i.e., 1%) of the 200 computing devices.

In step 146, processor 80 initiates a preventive action to inhibit C2 channel transmissions 28 from the one or more computing devices identified in step 144, and the method ends. In one embodiment, processor 80 can initiate the preventive action for a given computing device 26, by presenting, on UI device 86, a notification to a system administrator indicating that given computing device is suspected of using a given C2 channel 32 so as to abuse a given social media sits 34. In another embodiment, processor 80 can initiate the preventive action for a given computing device 26 by instructing firewall 52 to block transmissions 28 from the given computing device.

Finally, in step 148, processor 80 checks if there are any distinct process binaries 24 that were not selected in step 138. If processor 80 has not yet selected all of the distinct process binaries, then the method continues with stop 138. However, if processor 80 has selected all of the distinct process binaries, then the method ends.

In embodiments described herein, processor 80 can perform steps 136-140 so as to classify the process binaries identified in step 136 into a plurality of "classes" (i.e., process binary class records 92) of matching process binaries 24, and computing, for a given class, a count of the computing devices that that executed one of the process binaries of the given class. In other words, each given class references a set of matching process binaries 24. In the configuration shown in FIG. 3, each of the classes can be represented by a given process binary class record 92 comprising a unique process binary ID 116.

Returning to step 142, if count 118 in the selected process binary class record is not less than threshold 120, then the method continues with step 148.

As described supra in the description referencing steps 138-144 in FIG. 4, processor 80 counts the number of process binaries 24 belonging to a given process binary ID 116 in order to identify computing devices 26 that are using a C2 channels 32 to abuse social media sites 34. In some embodiments, processor 80 can count the number of processes (i.e., in step 138) by applying one of the following profiles 94 to the identified processes belonging to a given process binary ID 116:

A first example profile 94 comprises steps 138-144 where processor 80 identifies low (i.e., below the specified threshold) counts of computing devices 26 that executed process binaries 24 corresponding to a given process binary ID 100 and that accessed the specified Internet sites during the specified time periods.

In a second example profile 94, processor 80 can determine respective roles for computing devices 26, and filter out (i.e., from steps 138-144 described in FIG. 4) any of the computing devices having a specific role. One example of a specific role for one or more computing devices 26 is a scanner. A scanner typically comprises a given computing device 26 that is configured to gather information on other computing devices 26 coupled to network 36. Methods for detecting scanners are described, for example, in U.S. patent application Ser. No. 16/261,655.

In a third example profile 94, processor 80 can identify rare combinations of process binaries 24 and Internet sites 30. To execute this profile, processor 80 can:

Perform step 140 of computing the count of distinct computing devices 26 that executed any process binary 24 matching the given distinct process binary selected in step 136 by identifying Internet sites 30 accessed by the process binaries matching the selected distinct process binary, and computing, for each given identified Internet site 30, a respective additional count of the computing devices executing the identified process binaries matching the selected distinct binary and accessing the given Internet site.

Perform step 142 of comparing the count 118 to threshold 120 and detecting count 118 is less than threshold 120 by determining that a given additional count is less than an additional specified threshold. In some embodiments, the additional specified threshold 120 may comprise a specified percentage of computing devices 126, as described supra in the description referencing step 142.

Perform step 146 by initiating the preventive action for any of the computing devices executing the process binaries corresponding to the given additional count.

In a fourth example profile 94, processor 80 can identify rare combinations of command lines 106 and process binaries 24. To execute this profile, processor 80 can:

Perform step 140 of computing the count of distinct computing devices 26 that executed any process binary 24 matching the given distinct process binary selected in step 136 by identifying respective command lines 106 invoking the process binaries matching the given distinct binary, and computing, for each given identified command line 106, a respective additional count of the computing devices executing the identified command lines matching the given identified command line and invoking the process binaries matching the given distinct binary.

Perform step 142 of comparing the count 118 to threshold 120 and detecting count 118 is less than threshold 120 by determining that a given additional count is less than a specified additional threshold. In some embodiments, the additional specified threshold 120 may comprise a specified percentage of computing devices 126, as described supra in the description referencing step 142.

Perform step 146 by initiating the preventive action comprises initiating the preventive action for any of the computing devices executing the process binaries corresponding to the given additional count.

In a fifth example profile 94, processor 80 can compute respective periodicities that each of the process binaries identified in step 138 accessed the specified one or more Internet sites. To execute this profile, processor 80 can:

Perform step 140 of computing the count of distinct computing devices 26 that executed any process binary 24 matching the given distinct process binary selected in step 136 by computing respective periodicities that the computing devices executing the identified process binaries matching the given distinct process binary accessed each of the specified Internet sites.

Perform step 142 of comparing the count 118 to threshold 120 and detecting count 118 is less than threshold 120 by determining that a given periodicity of a given identified process binary 24 matching the given distinct process binary accessed a given Internet site 30 meets a specified periodicity threshold. For example, the specified periodicity threshold may be that the given identified process binary accessed the given Internet site on at least five days in the last 14 days.

Perform step 146 by initiating the preventive action for the computing device executing the process binary comprising the given periodicity meeting the specified periodicity threshold.

In a sixth example profile 94, processor 80 can identify rare execution chains whose respective endpoints comprise the process binaries identified in step 134. To execute this profile, processor 80 can:

Perform step 140 of computing the count of distinct computing devices 26 that executed any process binary 24 matching the given distinct process binary selected in step 136 by identifying respective execution chains invoking the process binaries matching the selected given distinct process binary, and computing, for each given identified execution chain, a respective additional count of the computing devices executing the identified execution chains matching the given identified execution chain and invoking the process binaries matching the given distinct binary.

Perform step 142 of comparing the count 118 to threshold 120 and detecting count 118 is less than threshold 120 by determining that a given additional count is less than a specified additional threshold. In some embodiments, the additional specified threshold 120 may comprise a specified percentage of computing devices 126, as described supra in the description referencing step 142.

Perform step 146 by initiating the preventive action comprises initiating the preventive action for any of the computing devices executing the process binaries corresponding to the given additional count.

In a seventh example profile 94, processor 80 can identify rare combinations of process binaries 24 and Internet sites accessed by the process binaries. To execute this profile, processor 80 can:

Perform step 140 of computing the count of distinct computing devices 26 that executed any process binary 24 matching the given distinct process binary selected in step 136 by identifying respective execution chains invoking the process binaries matching the selected given distinct process binary, identifying the Internet sites accessed by the process binaries matching the selected given distinct binary, and computing, for each combination of given identified execution chain and a given identified Internet site, a respective additional count of the computing devices executing the identified execution chains matching the given identified execution chain and invoking the process binaries matching the selected given distinct binary.

Perform step 142 of comparing the count 118 to threshold 120 and detecting count 118 is less than threshold 120 by determining that a given additional count is less than a specified additional threshold. In some embodiments, the additional specified threshold 120 may comprise a specified percentage of computing devices 126, as described supra in the description referencing step 142.

Perform step 146 by initiating the preventive action for any of the computing devices executing the process binaries corresponding to the given additional count.

In an eighth example profile 94, processor 80 can analyze respective periodicities for execution chains whose respective endpoints comprise the process binaries identified in step 134 and the Internet sites accessed by the endpoints. To execute this profile, processor 80 can:

Perform step 140 of computing the count of distinct computing devices 26 that executed any process binary 24 matching the given distinct process binary selected in step 136 by identifying the Internet sites accessed by the process binaries matching the selected given distinct binary, identifying respective execution chains invoking the process binaries matching the selected given distinct process binary, computing, for each given distinct execution chain and for each given distinct Internet site 30, a respective periodicity that the computing devices executing respective execution chains matching the given distinct execution chain accessed the given distinct Internet site.

Perform step 142 of comparing the count 118 to threshold 120 and detecting count 118 is less than threshold 120 by determining that a given periodicity meets a specified periodicity threshold.

Perform step 146 by initiating the preventive action for the computing device executing the execution chain comprising the given periodicity meeting the specified periodicity threshold. An example of a given periodicity threshold is described supra.

In additional embodiments, processor 80 can apply different combinations or apply all of the profiles described supra so as to identify process binaries 24 executing on computers 26 that are using C2 channels 32 to abuse social media sites 34. For example, processor a first given profile 94 to all the process binaries identified in step 134, apply a second given profile 94 to any of the process binaries identified (i.e., these are "remaining" process binaries 24) by the first given profile, apply a third given profile 94 to the process binaries identified by the second given profile, and so on.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for protecting a computing device, comprising:
   specifying one or more Internet sites that are accessible by one or more computing devices that communicate over a data network;
   identifying process binaries that executed on the computing devices and accessed and retrieved data from any of the specified one more Internet sites;
   classifying, by a processor, the identified process binaries into a plurality of classes of matching process binaries;
   computing, for a given class, a count of the computing devices that executed one of the process binaries of the given class; and
   when determining that the count of the computing devices is less than a predefined threshold, initiating a preventive action to inhibit command and control (C2) channel transmissions from any of the computing devices that executed any of the process binaries of the given class.

2. The method according to claim 1, wherein the Internet sites comprise social media sites.

3. The method according to claim 1, wherein identifying the process binaries comprises identifying process binaries that executed on the computing devices and accessed and retrieved data from any of the specified one more Internet sites during a specified time period.

4. The method according to claim 1, wherein identifying the process binaries comprises receiving, from software agents executing on the computing devices, information on the process binaries executing on the computing devices.

5. The method according to claim 1, and comprising determining respective roles for the computing devices, specifying a given role, identifying one or more of computing devices having the specified role, and excluding the identified one or more computing devices from the count.

6. The method according to claim 1, wherein computing the count comprises identifying the Internet sites accessed by the process binaries of the given class, and computing, for each given identified Internet site, a respective additional count of the computing devices executing any of the process binaries of the given class and accessing the given Internet site, wherein determining that the count is less than a predefined threshold comprises determining that a given additional count is less than a specified additional threshold, and wherein initiating the preventive action comprises initiating the preventive action for any of the computing devices executing the process binaries corresponding to the given additional count.

7. The method according to claim 1, wherein computing the count comprises identifying respective command lines invoking the process binaries of the given class, and computing, for each given identified command line, a respective additional count of the computing devices executing the identified command lines matching the given identified command line and invoking the process binaries of the given class, wherein determining that the count is less than a predefined threshold comprises determining that a given additional count is less than a specified additional threshold, and wherein initiating the preventive action comprises initiating the preventive action for any of the computing devices executing the process binaries corresponding to the given additional count.

8. The method according to claim 1, wherein computing the count comprises computing respective periodicities that the computing devices executing the identified process binaries of the class accessed by each of the specified Internet sites, wherein determining that the count is less than a predefined threshold comprises determining that a given periodicity meets a specified periodicity threshold, and wherein initiating the preventive action comprises initiating the preventive action for the computing device having the given periodicity.

9. The method according to claim 1, wherein computing the respective count comprises identifying respective execution chains invoking the process binaries of the given class, and computing, for each given identified execution chain, a respective additional count of the computing devices executing the identified execution chains matching the given identified execution chain and invoking the process binaries of the given class, wherein determining that the count is less than a predefined threshold comprises determining that a given additional count is less than a specified additional threshold, and wherein initiating the preventive action comprises initiating the preventive action for any of the computing devices executing the process binaries corresponding to the given additional count.

10. The method according to claim 1, wherein computing the count comprises identifying respective execution chains invoking the process binaries of the given class, identifying the Internet sites accessed by the process binaries of the given class, and computing, for each combination of given identified execution chain and a given identified Internet site, a respective additional count of the computing devices executing the identified execution chains matching the given identified execution chain and invoking the process binaries of the given class, wherein determining that the respective count is less than a predefined threshold comprises determining that a given additional count is less than a specified additional threshold, and wherein initiating the preventive action comprises initiating the preventive action for any of the computing devices executing the process binaries corresponding to the given additional count.

11. The method according to claim 1, wherein computing the count comprises identifying the Internet sites accessed by the process binaries of the given class, identifying respective execution chains invoking the process binaries of the given class, computing, for each given distinct execution chain and for each given distinct Internet site, a respective periodicity that the computing devices executing respective execution chains matching the given distinct execution chain accessed the given distinct Internet site, wherein determining that the count is less than a predefined threshold comprises determining that a given periodicity meets a specified periodicity threshold, and wherein initiating the preventive action comprises initiating the preventive action for the computing device executing the execution chain comprising the given periodicity meeting the specified periodicity threshold.

12. The method according to claim 1, wherein computing the count comprises computing a count of distinct users that that were operating the computing devices that executed any process binary of the given class.

13. An apparatus for protecting a computing system, comprising:
 a network interface card (NIC); and
 at least one processor configured:
  to specify one or more Internet sites that are accessible by one or more computing devices that communicate over a data network,
  to identify process binaries that executed on the computing devices and accessed and retrieved data from any of the one more specified Internet sites during a specified time period,
  to classify the identified process binaries into a plurality of classes of matching process binaries,
  to compute, for a given class, a count of the computing devices that executed one of the process binaries of the given class, and
  when determining that the count of the computing devices is less than a predefined threshold, to initiate a preventive action to inhibit command and control (C2) channel transmissions from any of the computing devices that executed any of the process binaries of the given class.

14. The apparatus according to claim 12, wherein the Internet sites comprise social media sites.

15. The apparatus according to claim 12, wherein a given processor is configured to identify the process binaries by identifying process binaries that executed on the computing devices and accessed and retrieved data from any of the specified one more Internet sites during a specified time period.

16. The apparatus according to claim 12, wherein a given processor is configured to identify the process binaries by receiving, from software agents executing on the computing devices, information on the process binaries executing on the computing devices.

17. The apparatus according to claim 12, wherein a given processor is further configured to determine respective roles for the computing devices, specifying a given role, to identify one or more of computing devices having the specified role, and to exclude the identified one or more computing devices from the count.

18. The apparatus according to claim 12, wherein a given processor is configured to compute the count by identifying the Internet sites accessed by the process binaries of the given class, and computing, for each given identified Internet site, a respective additional count of the computing devices executing any of the process binaries of the given class and accessing the given Internet site, wherein a given processor is configured to determine that the count is less than a predefined threshold by determining that a given additional count is less than a specified additional threshold, and wherein a given processor is configured to initiate the preventive action by initiating the preventive action for any of the computing devices executing the process binaries corresponding to the given additional count.

19. The apparatus according to claim 12, wherein a given processor is configured to compute the count by identifying respective command lines invoking the process binaries of the given class, and computing, for each given identified command line, a respective additional count of the computing devices executing the identified command lines matching the given identified command line and invoking the process binaries of the given class, wherein a given processor is configured to determine that the count is less than a predefined threshold by determining that a given additional count is less than a specified additional threshold, and wherein a given processor is configured to initiate the preventive action by initiating the preventive action for any of the computing devices executing the process binaries corresponding to the given additional count.

20. The apparatus according to claim 12, wherein a given processor is configured to compute the count by computing respective periodicities that the computing devices executing the identified process binaries of the class accessed by each of the specified Internet sites, wherein a given processor is configured to determine that the count is less than a predefined threshold by determining that a given periodicity meets a specified periodicity threshold, and wherein a given processor is configured to initiate the preventive action by initiating the preventive action for the computing device having the given periodicity.

21. The apparatus according to claim 12, wherein a given processor is configured to compute the respective count by identifying respective execution chains invoking the process binaries of the given class, and computing, for each given identified execution chain, a respective additional count of the computing devices executing the identified execution chains matching the given identified execution chain and invoking the process binaries of the given class, wherein a given processor is configured to determine that the count is less than a predefined threshold by determining that a given additional count is less than a specified additional threshold, and wherein a given processor is configured to initiate the preventive action by initiating the preventive action for any of the computing devices executing the process binaries corresponding to the given additional count.

22. The apparatus according to claim 12, wherein a given processor is configured to compute the count by identifying respective execution chains invoking the process binaries of the given class, identifying the Internet sites accessed by the process binaries of the given class, and computing, for each combination of given identified execution chain and a given identified Internet site, a respective additional count of the computing devices executing the identified execution chains matching the given identified execution chain and invoking the process binaries of the given class, wherein a given processor is configured to determine that the respective count is less than a predefined threshold by determining that a given additional count is less than a specified additional threshold, and wherein a given processor is configured to initiate the preventive action by initiating the preventive action for any of the computing devices executing the process binaries corresponding to the given additional count.

23. The apparatus according to claim 12, wherein a given processor is configured to compute the count by identifying the Internet sites accessed by the process binaries of the given class, identifying respective execution chains invoking the process binaries of the given class, computing, for each given distinct execution chain and for each given distinct Internet site, a respective periodicity that the computing devices executing respective execution chains matching the given distinct execution chain accessed the given distinct Internet site, wherein a given processor is configured to determine that the count is less than a predefined threshold by determining that a given periodicity meets a specified periodicity threshold, and wherein a given processor is configured to initiate the preventive action by initiating the preventive action for the computing device executing the execution chain comprising the given periodicity meeting the specified periodicity threshold.

24. The apparatus according to claim 12, wherein a given processor is configured to compute the count by computing a count of distinct users that that were operating the computing devices that executed any process binary of the given class.

25. A computer software product for protecting a computing system, the product comprising a non-transitory computer-readable medium, in which program instructions are stored, which instructions, when read by a computer, cause the computer:
   to specify one or more Internet sites that are accessible by one or more computing devices that communicate over a data network;
   to identify process binaries that executed on the computing devices and accessed and retrieved data from any of the one more specified Internet sites a specified time period;
   to classify the identified process binaries into a plurality of classes of matching process binaries;
   to compute, for a given class, a count of the computing devices that executed one of the process binaries of the given class; and
   when determining that the count of the computing devices is less than a predefined threshold, to initiate a preventive action to inhibit command and control (C2) channel transmissions from any of the computing devices that executed any of the process binaries of the given class.

* * * * *